Figure 1:
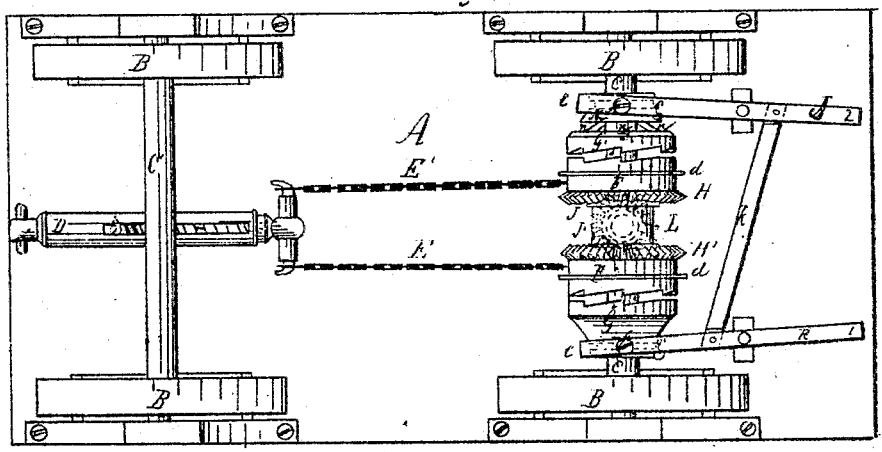

Sheet 1 - 2 Sheets

C. S. Hunt.
Stopping & Starting Cars.
No 75426   Patented Mar. 10, 1868.

WITNESSES          INVENTOR

Sheet 2–2 Sheets

C. S. Hunt.
Stopping & Starting Cars.
N° 75426.  Patented Mar. 10, 1868.

WITNESSES.  INVENTOR.

United States Patent Office.

C. S. HUNT, OF PARISH OF TERRE BONNE, LOUISIANA.

*Letters Patent No. 75,426, dated March 10, 1868.*

---

IMPROVEMENT IN STOPPING AND STARTING CARS.

---

The Schedule referred to in these Letters Patent and making part of the same.

---

TO ALL WHOM IT MAY CONCERN:

Be it known that I, C. S. HUNT, of the parish of Terre Bonne, and State of Louisiana, have invented a certain new, useful, and improved Apparatus for Starting, Reducing the Speed of, and Stopping Railroad-Cars; and I do hereby declare the following to be a full, clear, and exact description of the same, reference being had to the annexed drawings, making a part of this specification.

My invention is designed chiefly for use in connection with street-cars, when the same are drawn by mules or horses, but it may be adapted to and used in connection with steam-cars without the slightest difficulty, and with equal effect and advantage.

The great primal object sought to be accomplished by it is to relieve the animals that draw the street-cars from the tremendous strain to which they are subjected in starting the same from a state of rest when heavily laden, and the injuries consequent and resulting therefrom to the animal. Called upon at frequently-recurring intervals to put forth their whole strength in order to start the cars, which, after they have once started, run easily enough, my invention, in that it relieves the animals of this strain, which otherwise is found soon to wear them out, is of very great value.

In view of this evil, the urgent need of an effective starting-apparatus for street-cars has long been perceived and properly appreciated, and many efforts have been made to produce such an apparatus, but none of the organisms heretofore patented or tried, although, with respect to some of them, considerable ingenuity was displayed, have fulfilled the expectations of their inventors, and hence, one after another, they have been rejected and abandoned.

The cause underlying and producing a failure as to all these previous creations is easily pointed out, and has arisen chiefly out of the error into which the inventors had fallen with reference to the kind of power required to operate them. They have supposed, in fact, that a starting-apparatus could only be operated by the driver of the car or the animal that is harnessed to it, or else by attempting to utilize the momentum of the car by indirect methods and intermediate appliances, and, failing to bring into existence mechanical instrumentalities that would enable the driver or the animal to work the apparatus easily, or without some especial drawback that need not herein be specified, their efforts were necessarily abortive. In the machines intended to be worked by the driver it was found impossible so to adjust the parts as to put it into the power of the driver to perform the task assigned him without an exhaustive expenditure of his strength, and, consequently, after ascertaining this fact, no driver would attempt to operate the machine; nor, in the case of those arrangements designed to be worked by the animal attached to the car, was the result at all different, although the cause was not the same. With respect to these latter apparatus, the difficulty was to readjust the parts after the car had been once started, to start it again, without inflicting so severe a shock upon the animal as to produce as much injury to him as he would be likely to sustain from straining himself. It has also been found impossible, in consequence of the want of room under the cars, as at present constructed, to adapt such apparatus to them in such manner as to get sufficient power, and hence these disadvantages counteracting the advantages flowing out of the use of the apparatus, no better success followed this plan of construction than attended the other, in which the driver gave life to the machine.

In all existing organisms, in which the momentum of the car is sought to be applied, the loss by friction, in consequence of the presence of intermediate gearing, and the use of too many parts, is so great that none of them can be made to operate successfully.

Keeping these facts in mind in the creation of my invention, I discarded at once all idea of using either the driver or the animal to operate my machine, and looked elsewhere for the power to make it completely operative and efficient, and this power I have discovered in the momentum of the car itself, when the same is stored up by the use of an apparatus in which all the parts act in a direct and positive manner without the use of intermediate gearing; and my invention, therefore, consists of this discovery, and the adaptation of mechanical parts and powers to the garnering up or developing, and then practically applying the force of a powerful spring by and through the agency of the said momentum, when applied as above described, to start the car, and this without calling upon the driver for further duty than simply to move a lever, instead of the crank-brake now universally used, whenever the requisite force to start the car is to be put into action, and with far less effort of strength than is needed to operate the said brake.

Nor is the starting the car the only function performed by my invention. It supersedes all necessity for using any description of brake, for it will stop a car as well as start one; or, if it be desired to reduce the speed of a car without actually stopping it, this will be accomplished by it with equal facility, by the same lever, and will accomplish the object in the same manner as though a full stop is made, though differing in degree. By moving the lever to unclutch the pulley F before the full stop is made, the momentum garnered, or, so to speak, bottled up to such point, is at once utilized, and of course aids in accelerating the car over such rate of motion as it had before it was unclutched.

In this capability of stopping as well as of starting a car, and afterwards controlling its speed or rate of motion without actually stopping it, my apparatus differs again from all existing contrivances, which, without exception, require the common brake, which I discard, the sole function of such contrivances being to start the car. But my invention will be better understood by referring to the drawings, in which the same letters denote the same parts in all the figures.

Figure 1, plate 1, is a bottom view of my invention as when applied to a street-car.

In this figure, A represents the under side of the floor of the car, B the wheels, and C C' the axles thereof. Securely attached to the under side of the floor of the car, and near the rear end thereof, is a strong spring, D. On the drawings D is an enclosed spiral spring, but instead of a spiral, a volute, an elliptic, an air, or any other kind of spring may be used. The spring, as shown, is only for the purpose of illustration, and, in practice, it is probable I should use the elliptic, as combining in itself more advantages than are presented by any other form. The force residing in this spring is the power or motor that, developed by the momentum of the car, is brought into existence by a novel combination of mechanical parts, and afterwards employed to start the car.

To the spring D are attached two chains, E E', which are respectively secured to the perimeters of the two clutch-wheels or pulleys, F F', which are fitted upon and revolve loosely around the front axle, C. These chains are of the same length, and, when there is no tension on the spring D, and it occupies its normal position of rest, that length is just sufficient to reach from the spring to the nearest points of the circumference, respectively, of the clutch-pulleys F F', as is clearly shown at fig. 1, plate 1, and Figure 4, plate 2. The pulleys F F' are separated by sleeves or collars, J J', (see figs. 1 and 2, plate 1, and fig. 4, plate 2,) a sufficient space to allow the interposition between them of the bevelled cog-pinion L; or, if preferred, a separation of the clutch-pulleys F F' may be effected by a loose pulley, K, as shown at Figure 5, plate 2, which is totally disconnected from said clutch-pulleys. The pulleys F F' are kept in place by key-flanches o, fig. 2, plate 1, and they are provided with circles of cogs, H H', around their inner sides, at the extreme limit of their circumferences, which cogs take into the cogs of the bevel-pinion L. The bevel-cog pinion L revolves upon an axis that is securely fastened to the floor-timbers of the car, so as to occupy the relation to the clutch-pulleys, as shown at fig. 5, on the drawings, this said axis extending sufficiently through the pinion to allow the axis to rise and fall with the springing of the floor of the car without affecting the pinion.

In order to prevent the pinion L from resting too heavily upon the cogs of the pulleys F F', a flanch may be cast around the said pinion in such manner as that it shall be supported by the perimeters of said clutch-pulleys outside the cogs upon them, if support should be found to be necessary.

The effect of the connection by means of this intermediate pinion is, of course, to make the clutch-wheels revolve at precisely the same rate of speed, but in opposite directions, so that when the chain E is coiled or wound around the pulley F, chain E' is coiled around pulley F', but in a reverse direction. The importance of this arrangement will be seen as I proceed with this description.

Figure 2:
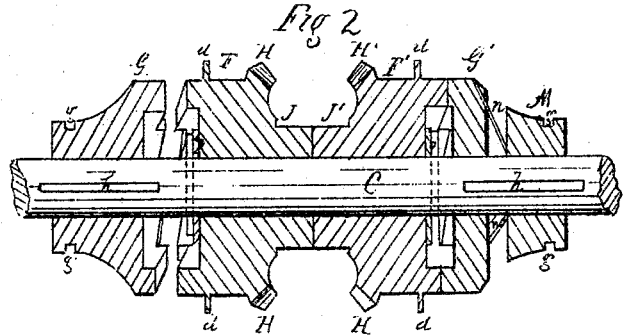
Figure 3:
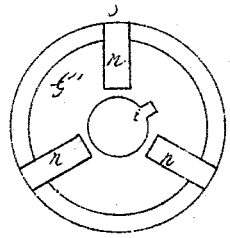

Projecting around the perimeter of pulleys F F' is an annular or concentric flanch, d, between which and the circle of cogs are the beds or grooves, into which the chains E E' are coiled in the operation of the machine. The pulleys F F' are respectively provided, on their exterior sides, by which I mean the sides next the car-wheels, with a circle of clutches or pawl-notches of the same conformation, but looking in opposite directions. Outside of the pulley F is a circular pawl or clutch, G, which, fitted loosely on axle C, in order that it may be easily moved endwise upon the same, is yet prevented from revolving by the usual application of a feather-key, or other equivalent device, as is shown at figs. 2 and 3, and marked h and i. The clutch G fits exactly into the notches of pulley F, and is moved into or out of connection with the same by means of the lever R, to which it is connected by yoke e and pin f, which takes into an annular groove, g, cut around said clutch.

Figure 4:
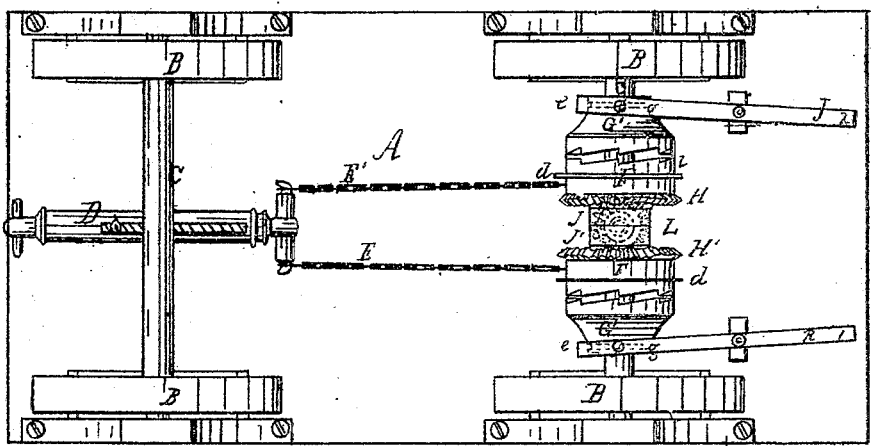
Figure 5:
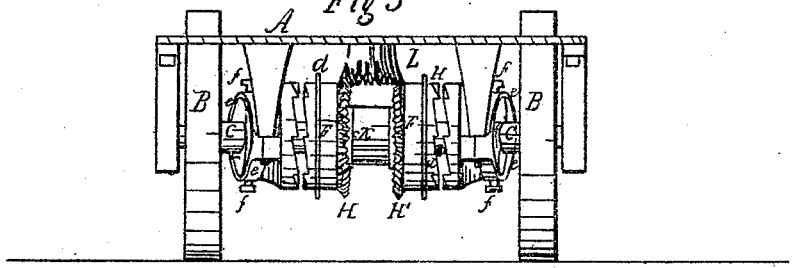

The annular groove g is shown at fig. 2; the pin f and yoke e at figs. 1 and 4. The lever R is connected to another lever, J, by a link or connecting-rod, k, the connection being, it will be perceived, on opposite sides of the fulcra of the two levers, so that the movement of one lever always brings about the movement of the other. The lever J is attached to a sliding block, M, by means of a collar or yoke. A pin and an annular groove, in the same manner as lever R, are attached to clutch G.

Between the sliding or tightening-block M and the clutch-wheel F' is a circular pawl or clutch, G', (shown in Figure 3, detached from all other parts,) which, it will be perceived, is provided with springs, n, on the face that is next block M. These springs may be as shown, or of any other suitable form, and may be attached to block M, instead of to G', or they may be entirely dispensed with, and a single spring, attached to or making a part of the inner end of lever J, might be introduced as a substitute to produce the same effect, but I prefer a combination of a positive and yielding pressure, as established by the inflexible lever J and the springs n, and deem it the best arrangement that can be devised.

Connected to the end 1 of lever R is a hand-lever, by means of which the driver operates the apparatus. This hand-lever is connected with or to lever R by any usual or proper means of attachment, and its fulcrum is placed at or near the plane of the car-floor, and consists of an ordinary pivot-joint. A movement of this lever towards the left side will throw the clutches G G' into connection with the clutch-pulleys F F', a movement to the right will throw these parts out of connection, and as there is no direct or positive resistance in the direction of the motion of any of these parts, it will be at once understood that very little power is required to move them, and that hence the driver can perform this duty with more ease than he could operate an ordinary crank-brake.

It is first necessary to start the car to which it is attached in order to endow my invention, so to speak, with life, for such endowment can only be effected by the motion of the car. The car being in motion, to stop it the operation of the apparatus is as follows, to wit: The driver pushes the hand-lever (which is not shown upon the drawings, but which I have sufficiently described,) to the left. In referring to the driver I always suppose him to be looking in the direction the car is travelling. This motion of the lever at once brings the clutches G G' into connection with pulleys F F', and the latter begin to revolve reversely upon the axle C, and to wind upon their peripheries the chains E E'. If the movement of the lever transversely to the motion or length of the car be inconvenient or embarrassing to the driver, by a very easy adaptation of well-known mechanical parts, any mechanic of ordinary skill can readily change that motion into a backward and forward direction. The chain E, in being wound around pulley F, is coiled in the direction of the revolution of the car-wheels, and hence it is upon this pulley that the duty falls of utilizing the momentum of the car, by developing the power or force of the spring D, which power increases as the chain E is wound up until the whole scope of the spring is taken up and the car-wheels can revolve no longer. They, therefore, must slip on the track till all motion of the car is stopped. In the process of winding up the chain E upon pulley F, pulley F' merely takes up the slack of chain E', and secures the same at intervals through the agency of spring-clutch G', until the car is stopped, very much after the manner in which the tension is secured in a ship's windlass or capstan by the pawl connected thereto. The instant the car stops the tension is equalized upon both the chains, and when it is desired to start it again it is only necessary to move the hand-lever to the right, or back, or forward, as the case may be, and disconnect the clutch G from the pulley F, when the whole power of the spring coming upon pulley F', the starting is accomplished by that power without any strain or impingement of consequence being thrown upon the intermediate pinion L. In disconnecting clutch G from pulley F, the lever J moves the block M away from spring-clutch G', so that when the spring D has performed its office of starting the car and resumed its normal position of rest, as shown at fig. 4, there is nothing in the way of said clutch G' to prevent it from being being disconnected from the pulley F' automatically by the reversed action of the pawl-notches upon the said clutch and clutch-pulleys against each other.

If it be desired not to stop the car, but only to reduce its speed, the operation is the same as that just described, with this difference, that the moment the speed of the car has been brought down to the desired rate, the clutch G is withdrawn from its connection with pulley F, and the power of the spring (as far as wound up or developed) is at once brought to bear to aid the animal to accelerate or renew the speed of the car.

My invention, under the form or construction above described, is not adapted to cars that run in both directions, or that require to be moved backward, but is especially designed for use in connection with cars that are turned, or can be turned on turn-tables, and always move with the same end in front, whether the same be impelled by steam, or air, or animal-power.

For use on cars that need to be backed, I have devised the modification of my invention that is exhibited at figs. 4 and 5, plate 2. At fig. 4 the view is similar to fig. 1, that is to say, it is a bottom view of the modified apparatus as when applied to a car, whilst fig. 5 is a front view, in which only those parts that are on or above or in front of the axle C are to be discovered. In order to make the apparatus capable of backing as well as starting a car, or, more accurately speaking, to effect such an adaptation as will secure the starting of a car in either direction, and at the same time allow it to be pushed or drawn in either direction, independently of the pressure of the apparatus, it is only necessary to make the clutch G' and block M (as shown in figs. 1 and 2, plate 1,) in solid single form, as shown at both figures on plate 2, and to remove the link or rod $k$ that connects the levers R and J, so that they can be operated separately, either by two distinct hand-levers, or by any contrivance which will perform the functions of two hand-levers; for it is plain that when the apparatus is thus modified, both the clutch-pulleys F F' will wind the chains up in opposite directions, as in the first plan of construction, although, as in that case, the force of the spring D will be developed by the pulley that turns in the same way with the car-wheels, and hence that after the car stops, and the tension exerted by the spring is thus divided and becomes equal on both the pulleys, that tension or strain can be thrown upon either of them by simply unclutching the other, and accordingly as the pulley on which the whole strain is thus brought revolves, or is revolved in the one or the other direction, so will the car be started backward or forward when that pulley in its turn is unclutched and the spring is permitted to act upon it. The moment the spring D reaches its normal position of rest, and the tension thus ceases upon the clutch-pulley, no matter which of the two has been acting, it is unclutched by the action of the inclined planes of their own and the clutch-notches or teeth against each other.

Another modification which I have not deemed it necessary to illustrate by drawings involves the substitution of cogged bars and cog-wheels in lieu of the chains E E' and pulleys F F'. By this modification I dispense with the intermediate pinion L, and can use, if I shall consider it desirable, cog-wheels of unequal diameters, and thus obtain a proportionate increase of power in starting the cars. In other respects, as in the clutches, clutch-gear, levers, &c., there is no difference between an apparatus constructed upon this latter plan and the two others previously described.

A still further modification, of which also there is no representation on the drawings, dispenses with the use of one of the chains E or E', whilst all the other parts remain as shown upon plate 1 or 2, as the case may be. But in this case great strain is thrown upon the intermediate pinion L, and on that account I shall never, probably, attempt to construct an apparatus for real use upon such a plan.

I have described my apparatus as connected with or attached to the front or fore axle of a car exclusively, but it is proper to say that I contemplate a connection of my apparatus with the rear or hind axle, if such connection shall be found necessary or desirable, by any simple and well-known mechanical parts, in such manner as that the power may be brought to bear upon said rear axle to stop the revolution at one and the same time that the revolution of the first axle is stopped.

In all the different forms in which my invention may be constructed it will be observed that the momentum of the car developes the power that is applied to the objects sought to be attained, and that this power or force is always applied directly, and without the application of any intermediate appliance of any kind whatsoever.

Having thus described my invention, what I claim, and desire to secure by Letters Patent, is—

1. The loose pulleys F F' on axle C, in combination with chains E and E', and spring D, arranged and operating substantially as and for the purpose set forth.

2. The loose pulleys F F', chains E E', and spring D, in combination with clutches G G' and their actuating-levers, arranged for joint operation substantially as described.

C. S. HUNT.

Witnesses:
G. CENAS,
A. HERO, Jr.